United States Patent
Chen et al.

(10) Patent No.: US 7,913,920 B2
(45) Date of Patent: Mar. 29, 2011

(54) DOCUMENT PROCESSING DEVICES, SYSTEMS AND METHODS THEREOF

(75) Inventors: Jindong Chen, Belmont, CA (US); Jeff Breidenbach, Mountain View, CA (US); Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1133 days.

(21) Appl. No.: 11/613,267

(22) Filed: Dec. 20, 2006

(65) Prior Publication Data

US 2008/0148970 A1 Jun. 26, 2008

(51) Int. Cl.
*G06K 19/06* (2006.01)

(52) U.S. Cl. .......................... 235/494; 235/101; 235/375

(58) Field of Classification Search .................. 235/375, 235/435, 454, 470, 494, 101
See application file for complete search history.

(56) References Cited

U.S. PATENT DOCUMENTS

| | | | | |
|---|---|---|---|---|
| 3,355,016 A * | 11/1967 | Prince | ............................ | 209/562 |
| 4,900,905 A * | 2/1990 | Pusic | ............................ | 235/381 |
| 5,025,386 A * | 6/1991 | Pusic | ............................ | 700/227 |
| 5,065,000 A * | 11/1991 | Pusic | ............................ | 235/381 |
| 5,168,147 A | 12/1992 | Bloomberg | | |
| 5,453,605 A * | 9/1995 | Hecht et al. | ........................ | 235/494 |
| 5,486,686 A | 1/1996 | Zdybel, Jr. et al. | | |
| 5,682,540 A | 10/1997 | Klotz, Jr. et al. | | |
| 5,734,752 A * | 3/1998 | Knox | ............................ | 358/3.28 |
| 5,761,686 A * | 6/1998 | Bloomberg | .................... | 715/234 |
| 5,825,933 A * | 10/1998 | Hecht | ............................ | 382/243 |
| 5,852,973 A * | 12/1998 | Kessler | ........................ | 101/105 |
| 5,901,224 A * | 5/1999 | Hecht | ............................ | 713/179 |
| 5,949,055 A * | 9/1999 | Fleet et al. | ...................... | 235/469 |
| 6,000,613 A * | 12/1999 | Hecht et al. | .................... | 235/456 |
| 6,327,395 B1 | 12/2001 | Hecht | | |
| 6,341,730 B1 * | 1/2002 | Petrie | ............................ | 235/494 |
| 6,641,053 B1 * | 11/2003 | Breidenbach et al. | ......... | 235/494 |
| 6,819,776 B2 * | 11/2004 | Chang | ............................ | 382/100 |
| 6,873,430 B2 | 3/2005 | Grasso et al. | | |
| 7,028,902 B2 * | 4/2006 | Xu et al. | ...................... | 235/462.1 |
| 7,168,036 B2 * | 1/2007 | Klotz et al. | .................... | 715/273 |
| 7,197,644 B2 * | 3/2007 | Brewington | .................. | 713/176 |
| 2001/0017932 A1 * | 8/2001 | Chang | ............................ | 382/100 |
| 2004/0075851 A1 * | 4/2004 | Hecht | ............................ | 358/1.9 |
| 2004/0205626 A1 * | 10/2004 | Klotz et al. | .................... | 715/526 |

(Continued)

FOREIGN PATENT DOCUMENTS

| EP | 0465011 A | 1/1992 |
|---|---|---|
| EP | 0 469 864 B1 | 1/1999 |
| EP | 1 001 605 A2 | 5/2000 |

(Continued)

OTHER PUBLICATIONS

EP Search Report, Appl. No. EP07123532, Dated Feb. 5, 2009.

(Continued)

*Primary Examiner* — Daniel A Hess
*Assistant Examiner* — Paultep Savusdiphol
(74) *Attorney, Agent, or Firm* — Fay Sharpe LLP

(57) ABSTRACT

A document processing system and method thereof are disclosed. The system comprises machine-readable data such as DataGlyphs and human-readable data such as rendering text of the DataGlyphs that are applied on the document. Processing devices of the system can decode document-processing instruction(s) embedded in the machine-readable data, and then optionally execute at least part of the instruction automatically. A designed stamp is also provided to generate the machine-readable data and human-readable data on the document.

18 Claims, 7 Drawing Sheets

U.S. PATENT DOCUMENTS

2005/0133608 A1* 6/2005 Baiera .......................... 235/494

FOREIGN PATENT DOCUMENTS

| FR | 2709630 A | 3/1995 |
|----|-----------|--------|
| WO | 9101606 A | 2/1991 |
| WO | 9925561 A | 5/1999 |

OTHER PUBLICATIONS

Web pages, Create Your Own Data Glyph, http://www.dataglvphs.com/advanced-encode.php, 2 pages.

Hecht, David L., "Printed Embedded Data Graphical User Interfaces", *Computer*, Mar. 2001, pp. 47-55.

* cited by examiner

DOCUMENT PROCESSING DEVICES, SYSTEMS AND METHODS THEREOF

BACKGROUND

The following relates to processing of documents, and more particularly to processing hardcopy documents in an environment, including both manual and automated operations. It finds particular application in conjunction with applications in business fields such as finance, banking, insurance, taxation, health care and pharmaceuticals, retailing, law firm docketing, centralized scanning service, etc. for document management, fraud prevention, inventory tracking, cryptography, ID cards, parts marking, product tagging, and the like. However, it is to be appreciated that the following is amenable to other like applications.

Those engaged in institutional document processing will manually mark hardcopy documents with stamps in processing steps, indicating the nature or condition of the documents, date of receipt, future processing instructions, and other such information. More particularly, large-scale document processing centers will often mark paper documents with stamps containing instructions for a future processing step (e.g., "MAKE COPIES", "SEND TO SECTION A4", "DESTROY EXTRA COPIES", "START OF DOCUMENT", "END OF DOCUMENT", etc.). These markings are read by people as part of ongoing workflow. The marks are in human readable form and cannot be easily recognized by a computer system, and hence are regarded as an obstacle for migration to more automated document processing.

For example, as shown in FIG. 1, a hardcopy document 10, which is to be processed in a document processing facility, may include computer generated text and/or images 12, as well as handwritten notes 14. A conventional stamp image 16 may be applied to document 10, providing some form of information to a human operator (e.g., in this example, the human operator is informed the document has a "RAISED SEAL"). This example illustrates a situation where document 10 includes a mixture of computer generated text and/or images 12, handwritten words 14, as well as stamp image 16, all with different characteristics in a complicated document.

One attempt to automate processing of hardcopy documents is by employing a computer system which attempts to identify and "read" the human-readable text. However, while there have been attempts to improve a computer's ability for this reading (e.g., optical character recognition), such systems are very expensive, take significant amount of time to implement, may require the complete reorganization of a document processing center, and have issues relating to reliability, particularly with complicated documents, such as document 10.

Another approach to assist in automating the processing of hardcopy documents is to apply a bar code which may be printed, applied as stickers or otherwise attached to the document, and which may have information as to a further processing step. However, a problem with bar codes is they cannot be read by human operators. Further, bar codes applied as stickers can fall off a document, so the document cannot be read, and may also gum-up a scanner being used to scan the document.

Still a further attempt at automating the flow of hardcopy documents is through the use of paper user interfaces (UIs). In a paper user interface system, a user accesses the system (or device) by use of a cover sheet, i.e., a piece of paper with machine readable code and, possibly, handwritten instructions. Typically, the hardcopy media is scanned, and the machine readable code is decoded, and any resulting instructions are executed by the system.

For example, U.S. Pat. No. 5,682,540 to Klotz, Jr. et al. discloses the use of paper forms with machine readable and human readable information as document surrogates or tokens for electronic files. An example of a Paper UI system is the Xerox FlowPort™ system which employs paper forms called PaperWare® forms which enable users to scan, store, email, Internet fax and remotely print electronic documents. This approach can be tedious and relatively inefficient, as it requires a special-purpose cover sheet to be used for each job which then requires the special purpose paper to always be in stock. Further, when as in some document processing situations different instructions may need to be applied to different pages of a document (e.g., page 5 of a document may need to go to person A and page 15 of the same document may need to be copied 5 times, etc.), it would be necessary to provide a cover page of each affected page of the document. Still further, unlike the physical stamp which is human readable, the paper interface concept does not provide the instructions on the same page of the document. Due to at least these differences, the use of cover sheets would lead to errors caused by inappropriately combining with the wrong cover sheets and document pages, creating processing errors.

Another drawback of the foregoing concepts, including bar codes, and paper user interface systems, are that they are very limited in the amount of information which may be transmitted when they are provided as one-dimensional codes. There are, however, other technologies known as two-dimensional codes which deploy encoding schemes where significantly more data may be incorporated in substantially the same physical area. Included among these two-dimensional coding concepts are glyph codes, such as DataGlyph codes developed by Xerox Corporation.

For example, U.S. Pat. No. 5,168,147 (Bloomberg), incorporated herein by reference, discloses binary image processing techniques for decoding bitmap image space representations of self-clocking glyph shape codes of various types (e.g., codes presented as original or degraded images, with one or a plurality of bits encoded in each glyph, while preserving the discriminability of glyphs that encode different bit values) and for tracking the number and locations of the ambiguities (sometimes referred to herein as "errors") that are encountered during the decoding of such codes.

Another glyph concept is disclosed in European Patent 469,864 B1 (Bloomberg et al.), incorporated herein by reference, which discloses self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned into an electronic document processing system.

Still further, U.S. Pat. No. 6,873,430 discloses a knowledge management system and method thereof using Xerox Data-Glyph stickers, and U.S. Patent Application 20040205626 discloses user interface identification and service tags for document processing system, both documents hereby incorporated in their entireties herein.

However, none of the above concepts deal specifically with processing hardcopy documents which require both manual and automated processing and, more particularly, with the unique issues raised in large document processing centers, where a number of operations are undertaken manually, while others are to be accomplished automatically.

Accordingly, there is a continuing need in the art for improved techniques for document processing, which can effectively manage documents in a domain, that processes hardcopy documents using both manual and automated operations.

BRIEF DESCRIPTION

According to certain aspects illustrated herein, a document processing system is disclosed. The document processing system comprises (i) machine-readable data applied on the document; (ii) human-readable data applied on the document; and (iii) a processing system. The machine-readable data comprise document-processing instruction to be executed on the document. The human-readable data are coordinated with the machine-readable data. The processing system reads the machine-readable data, and optionally executes at least part of the document-processing instruction automatically.

According to certain aspects illustrated herein, an inking/stamping device used for document processing is disclosed. The inking/stamping device can generate machine-readable data and human-readable data on a document. The machine-readable data comprise a document-processing instruction to be executed on the document.

According to certain aspects illustrated herein, a method for processing a document is disclosed. The method comprises (i) applying on the document with machine-readable data that comprise document-processing instruction; (ii) applying on the document human-readable data that are coordinated with the machine-readable data; (iii) reading the machine-readable data with a processing system; and (iv) executing at least part of the document-processing instruction automatically using the processing system.

DETAILED DESCRIPTION

Figure 1:
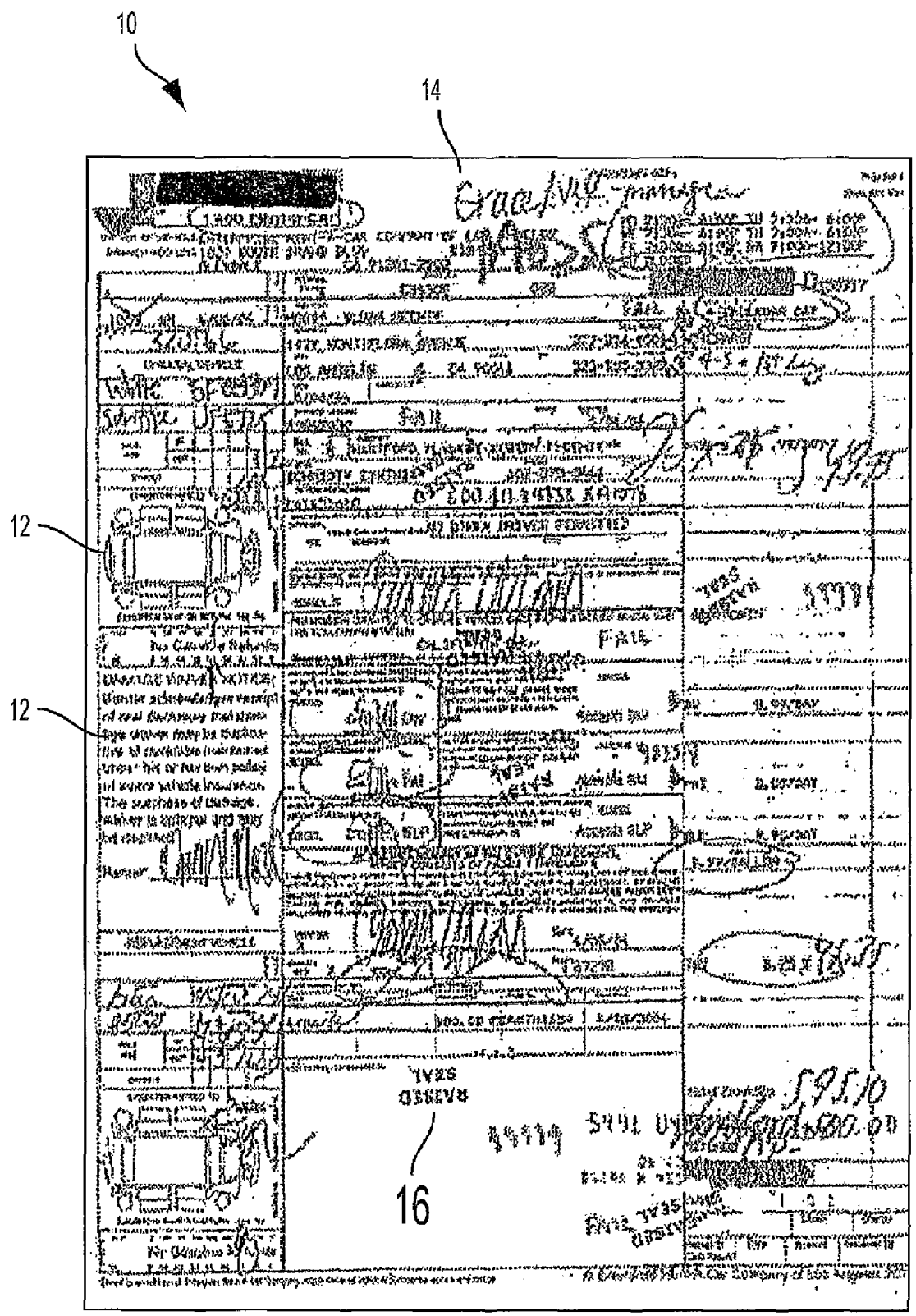
FIG. 1 illustrates a stamp print as applied to a hardcopy document.

As discussed in connection with FIG. 1, stamps are used within some document processing environments to pass information to a human worker (operator), however, such stamps are not able to efficiently or effectively be used in automated processes.

Figure 2:
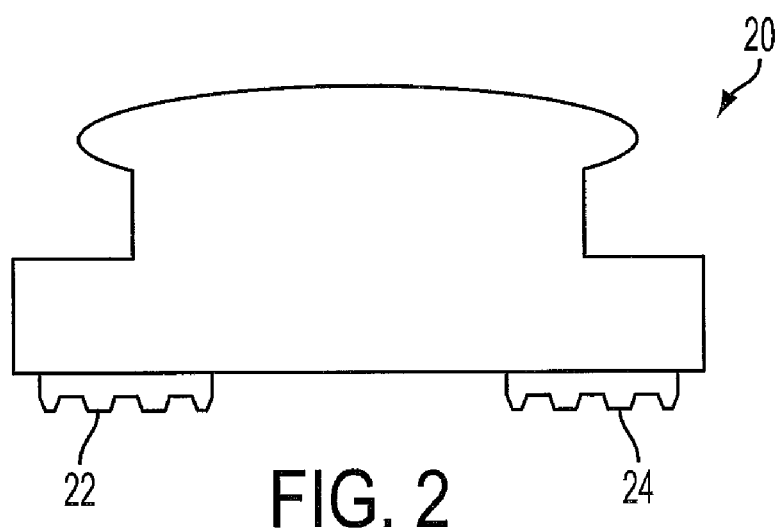
FIG. 2 depicts an inking/stamping device incorporating the concepts of the present application.
Figure 3:
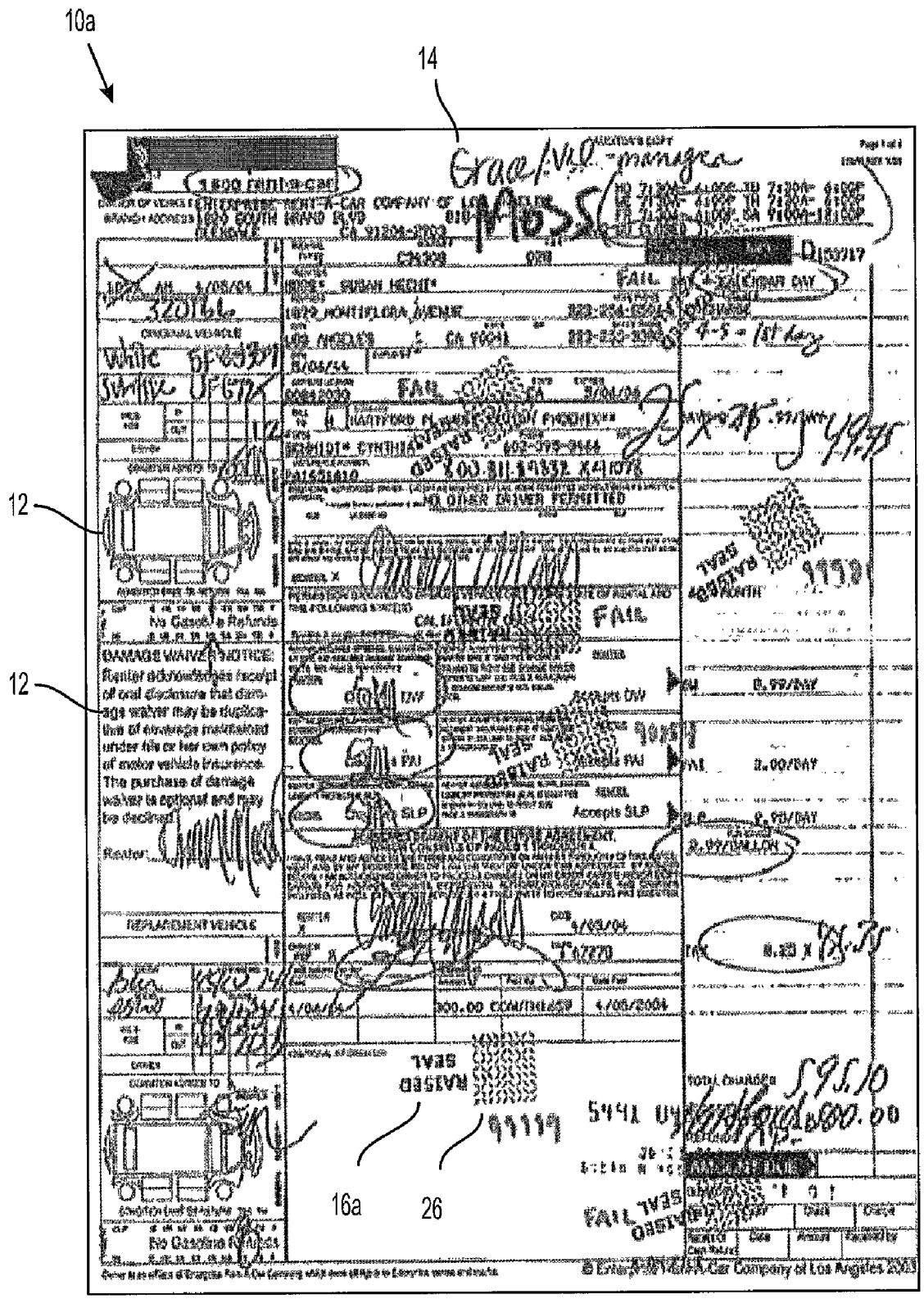
FIG. 3 sets forth a document which has a machine readable data area and human readable data area applied by the inking/stamping device of FIG. 2.

Turning to FIG. 2, illustrated is a first embodiment of an inking/stamping device 20 which addresses the aforementioned shortcomings. Inking/stamping device 20 may be a self-inking stamp, or may have the ink applied by an external operation, which are both well known in the art. Included is a machine-readable data area 22 and a human-readable data area 24. Once areas 22 and 24 have been inked, inking/stamping device 20 is applied to a document, such as document 10' of FIG. 3. Similar to document 10, human readable data 16a is printed on document 10 by application of inking/stamping device 20. However, a difference between document 10 and document 10a is the inclusion of machine-readable data 26. This machine readable data may contain the same information as the human readable data 16a, or may include information distinct from human readable data 16a. Thus, inking/stamping device 20 of FIG. 2 permits the document of FIG. 3 to be used in a hybrid human-automated document processing environment.

The human readable data 16a and machine readable data 26 are arranged in proximity to each other so as to be recognized as coming from a same source. In some embodiments, less than 1 inch will separate data 16a from data 26, and in other embodiments, the separation will be in a range of 1 inch to 0.1 of an inch, or they may only be separated enough so they do not interfere with transmission of their data. At least one benefit of locating the machine readable data and human readable data in a close physical relationship to each other is that it allows the human operator to understand that "automated" data exists. Device 20 may be designed to print the human-readable data 16a and machine-readable data 26, on document 10, simultaneously.

Figure 4:
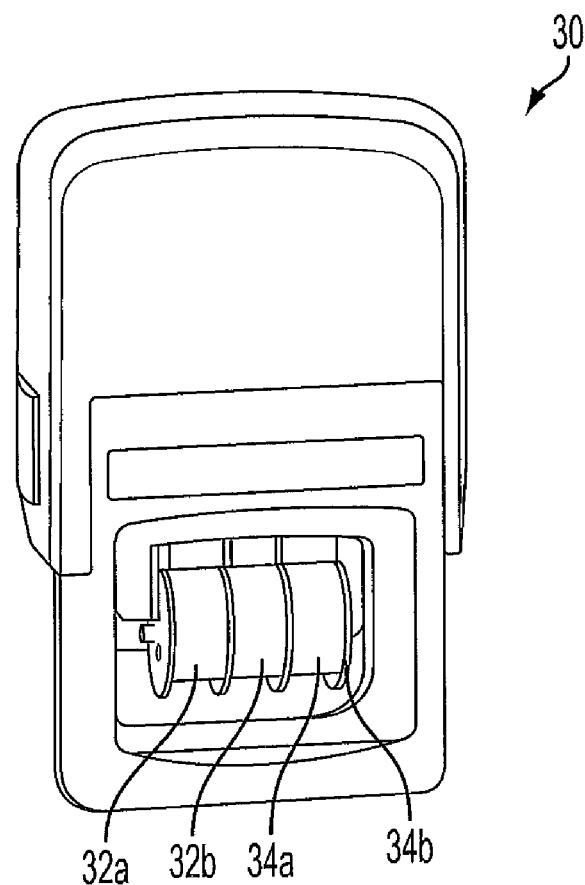
FIG. 4 is an exemplary dial stamp which prints both human-readable text and glyph patterns according to an embodiment of the disclosure.

Inking/stamping device 20 of FIG. 2 is considered a static device. Particularly, whatever information is in the human readable and machine readable areas cannot be changed. However, there are certain advantages to be obtained by dynamically changing machine readable data area 26 and/or human readable data area 16a. Therefore, as shown in FIG. 4, dynamic inking/stamping device 30 includes flexible, movable belts 32a, 32b which contain glyph code data, and flexible, movable belts 34a, 34b, which contain human readable data. In operation, these belts are dialed to direct certain information to be printed to a document surface. By this design, information is dynamically provided to a physical document, dependant upon the particular processing to which that document is directed. While only four movable belts have been shown, it is to be appreciated other numbers of belts may be used to increase the flexibility of data printed to a document. Still further, it is to be understood the dynamic nature of this embodiment may take form in a system similar to an automated stamping machine, such as automated postal machines, as are known in the art, and the embodiments of this application are intended to cover such devices.

Figure 5:
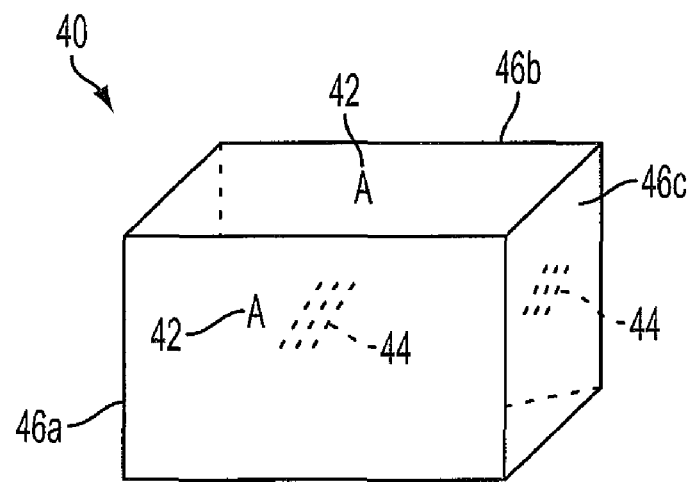
FIG. 5 is a dynamic cube shape inking/stamping device according to the present application.

Another dynamic implementation is shown in FIG. 5, which illustrates a six-sided inking/stamping cube 40. In this embodiment, human readable data (e.g., alphanumeric characters) 42 and machine readable data (such as glyphs) 44 are provided on multiple sides of cube 40. It is to be appreciated that data 42 and 44 may be combined on a single surface 46a, or on separate surfaces 46b, 46c of cube 40. Then when printing occurs, either a single surface or multiple surfaces are pressed to the physical document.

Figure 6:
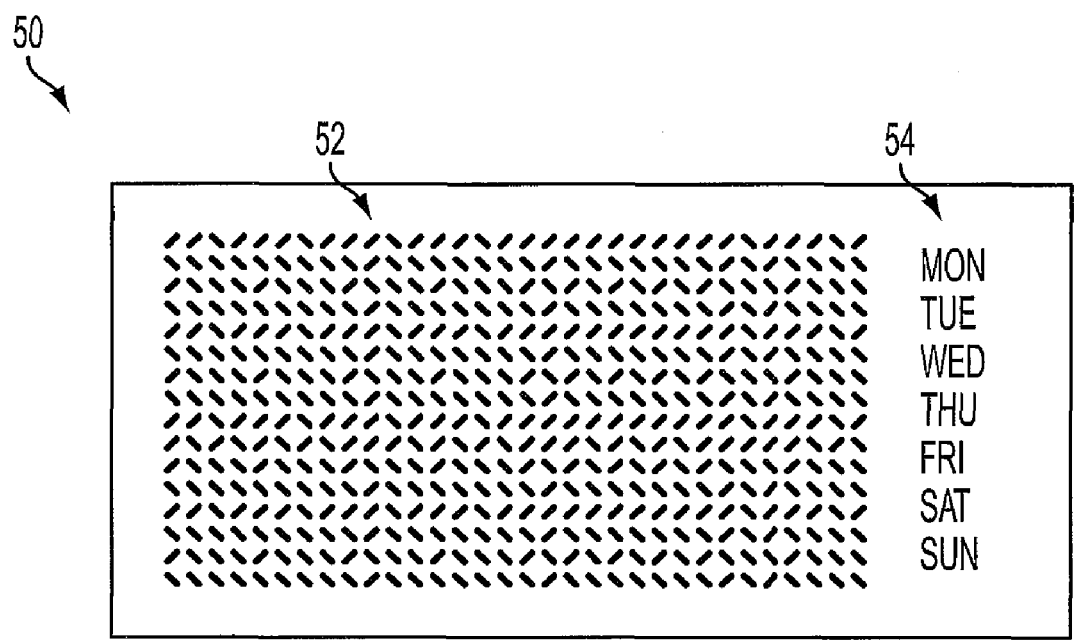
FIG. 6 illustrates an address carpet with human readable text and machine readable text which can be wrapped around a roller of an inking/stamping device according to an embodiment of the application.
Figure 7:
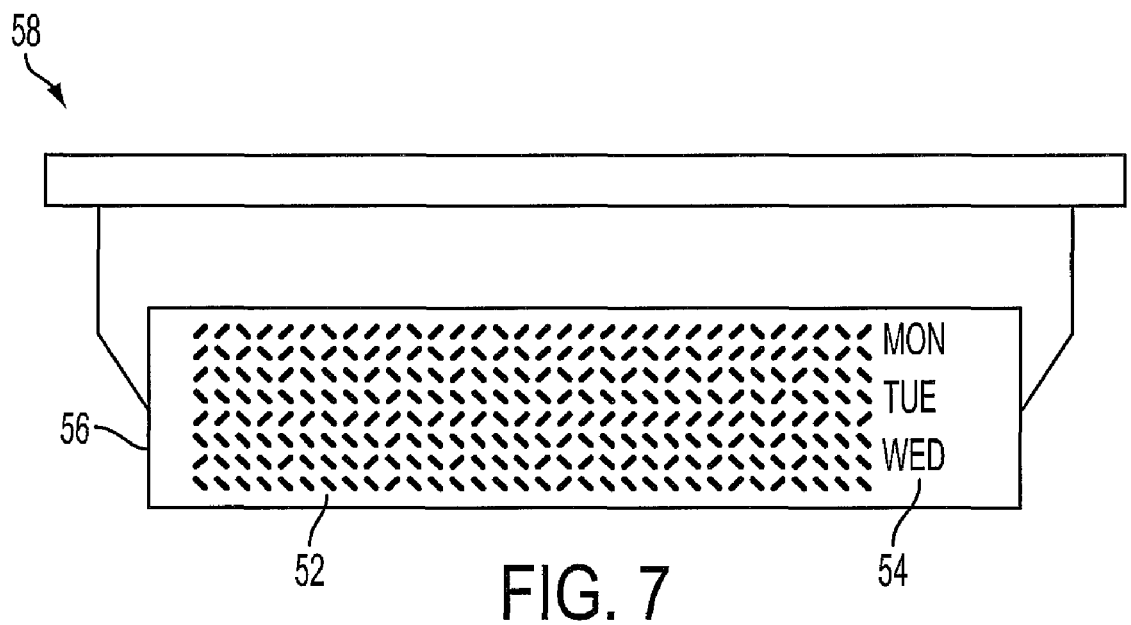
FIG. 7 shows the front view of an address carpet wrapped in the roller of another embodiment of an inking/stamping device according to the disclosure.
Figure 8:
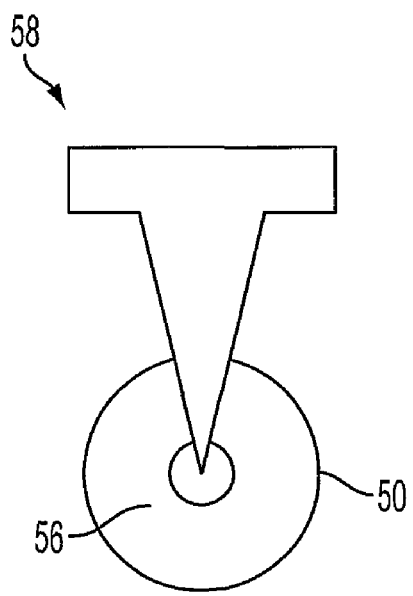
FIG. 8 shows a side view of FIG. 7.

A further embodiment of a dynamic nature is depicted by FIGS. 6-8. In this embodiment, a curved surface (i.e., which may be on a flat piece of flexible material) 50 includes a machine readable data area 52 and a human readable data area 54. The curved surface 50 is wrapped around a roller 56 of dynamic dial inking/stamping device 58. In practice, a user dials inking/stamping device 58 so a particular portion of curved surface 50 is printed to a page (such as a piece of paper) of a document. Curved surface 50 is designed so that the long horizontal stripe (i.e., the glyph) will produce a valid readout of both the human readable data and the machine readable data. The machine-readable data is designed to use a "glyph address carpet" or "DataGlyph address carpet", formed by the above components. It is to be understood that an "address carpet" is a special kind of glyph (e.g., DataGlyph) coding scheme which emphasizes local addressability. In other words, the glyph codes encode coordinate information in such a way that a limited region of glyphs (for example, 4×4 glyph marks in some settings) is enough to identify its unique coordinates in a high dimensional space (typically two-dimensional, and hence called address carpet). The idea of combining the address carpet code and a dialable stamp includes using a portion of the glyphs on the bottom of the stamp, which, although not the whole glyph block, is enough to identify the documents with unique addresses in a two-dimensional space, whereby the addresses can be used to index into information entities of a user's choice, for example, days of the week.

An example of a glyph address carpet is shown in U.S. Pat. No. 6,327,395, entitled "Glyph Address Carpet Methods and Apparatus for Providing Location Information in a Multidimensional Address Space." Another related patent is U.S. Pat. No. 5,453,605, entitled "Global Addressability for Self-Clocking Glyph Codes", both hereby incorporated by reference in their entireties.

Figure 9:
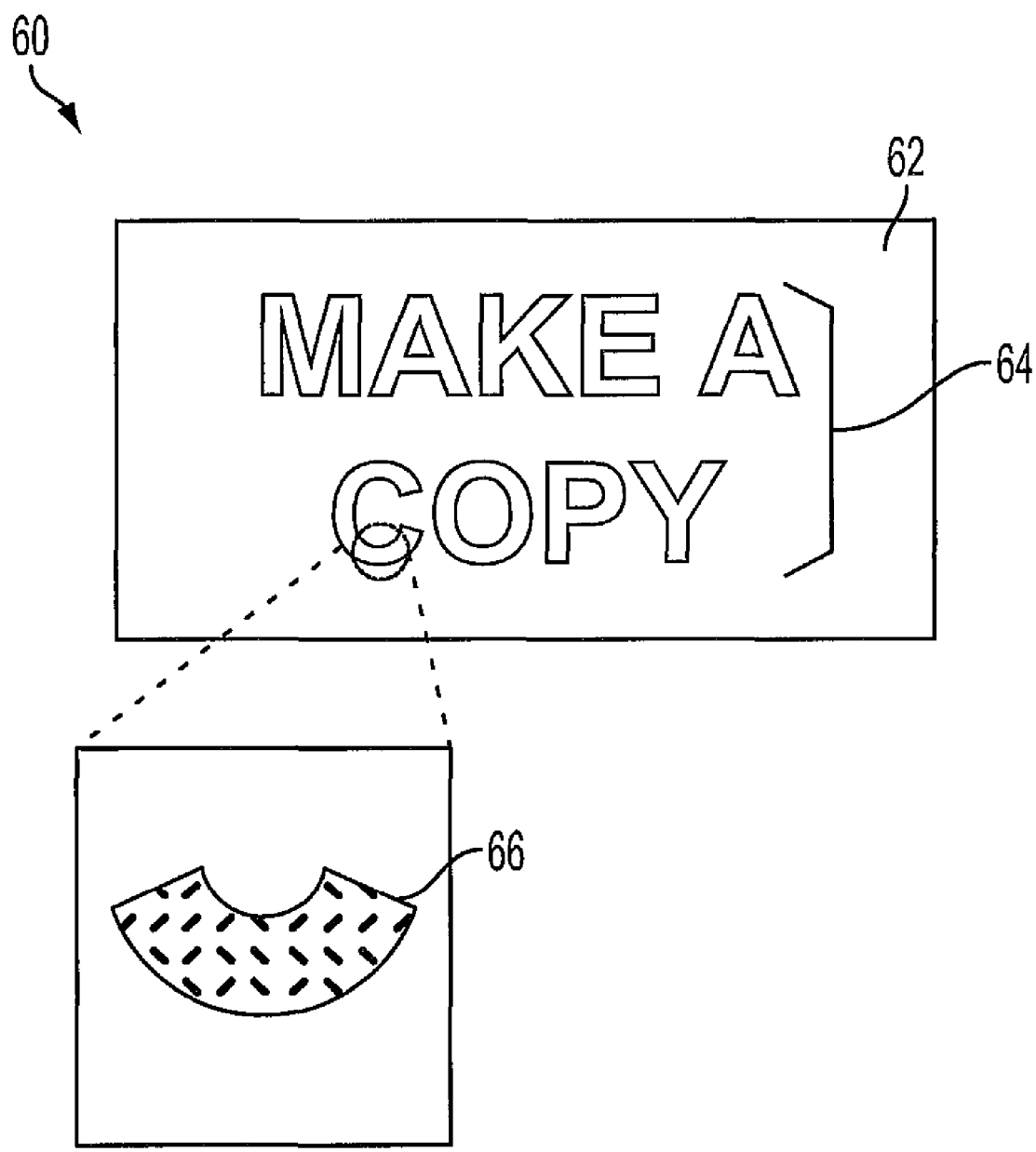
FIG. 9 illustrates an inking/stamping device according to the teachings of the present application, wherein the human readable data area is comprised of machine readable data.

FIG. 9 illustrates another embodiment of an inking/stamping device 60 in accordance with the concepts of the present application. In this Figure, device 60 is positioned with its stamping surface 62 facing outward, showing human readable section ("MAKE A COPY") 64. However, this embodiment is different from previous embodiments in that data ("MAKE A COPY") in the human readable section 64 is formed by glyph type codes such as shown in exploded view section 66. Thus, in this embodiment, the data which may be read by the machine is used to make the data in human readable section 64. Due to the high density of glyph type data coding, it may not be necessary for all of the human readable data to be formed from machine readable codes. For example, it is possible that only the letter "C" needs to be a glyph code, and the remainder of human readable code 64 may simply be regular typeface. It is to be appreciated that inking/stamping device 60 of FIG. 9 may be implemented in a static as well as a dynamic form, as in the previous embodiments. Incorporating glyph codes into human readable portions of an image are discussed, for example, in U.S. Pat. No. 6,641,053, entitled, "Foreground/Background Document Processing with Dataglyphs, hereby incorporated in its entirety herein.

Figure 10:
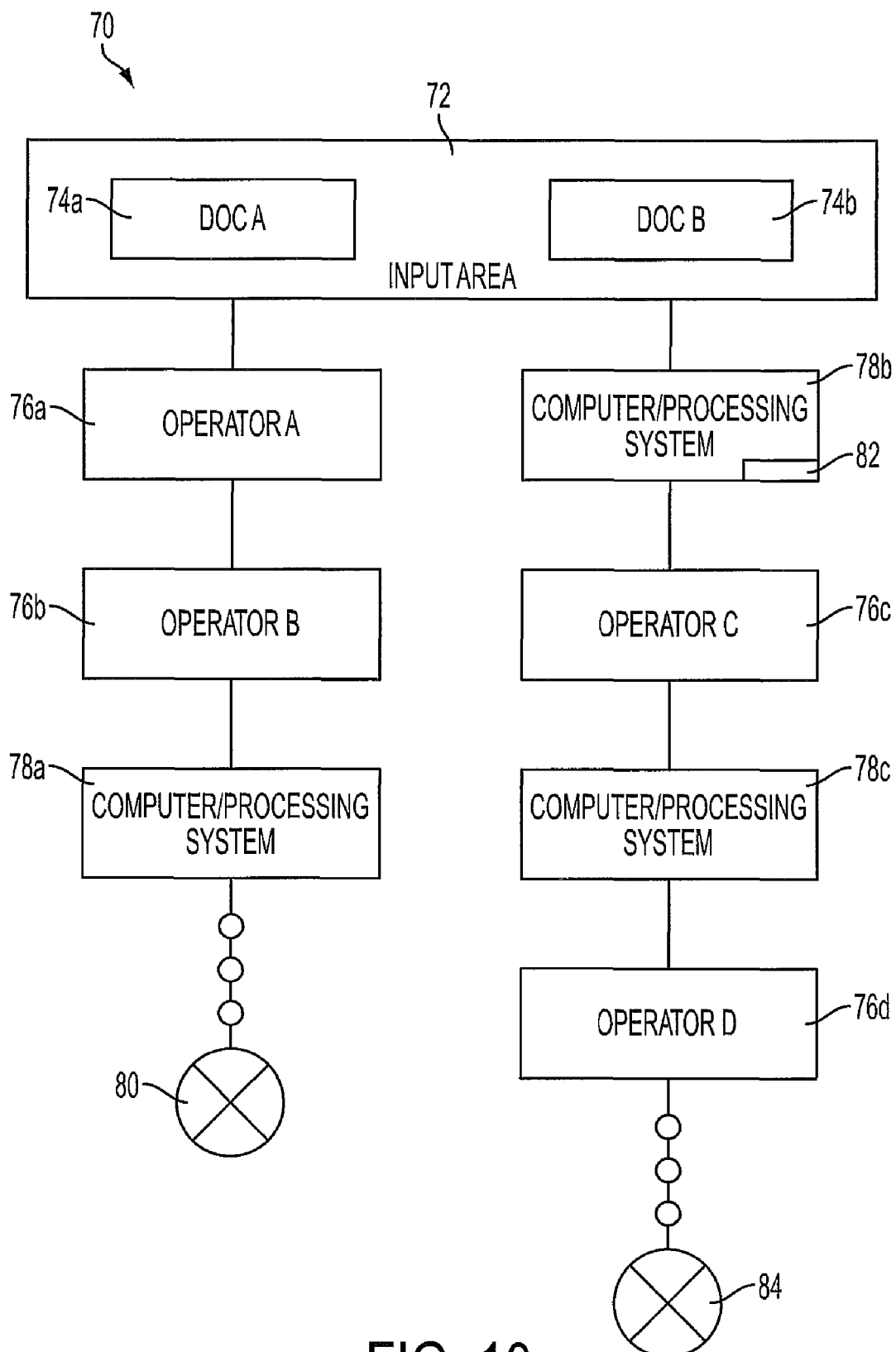
FIG. 10 depicts a system in which the concepts of the present application are applied.

Turning now to FIG. 10, an implementation of the above concepts in a document processing environment, where the documents are physical hardcopy documents, is shown. In document processing system 70, hardcopy documents are provided to a document input section 72. Within this section there may be thousands of documents having different numbers of pages or sheets, different sheet or page sizes (e.g., paper), being in different degrees of deterioration (i.e., pages may be torn or crumpled), or the pages of the documents may be of different types of material, such as very thin velum paper, thick paper, plastic, etc.

For purposes of this explanation, the particular documents to be discussed are documents, Doc A (74a) and Doc B (74b).

Of course, as previously mentioned, many more documents may be processed through system 70, and system 70 may have many different processing paths.

Initially, Doc A (74a) is brought into the document input area 72 (e.g., via a truck, etc.), which may be a warehouse or other holding facility. When Doc A (74a) is to be processed, it is provided to a human employee Operator A (76a), who has instructions that Doc A (74a) needs to have all reference to a company name (e.g., Company XYZ) redacted from its pages. Human Operator A may understand that human Operator B (76b) is the person to perform this task. Therefore Operator A (76a) stamps this document with instructions that it be provided to Operator B (76b) for redacting. Operator A may also know that once the appropriate sections are redacted, the document is to be electronically scanned and stored in a particular electronic file. In this embodiment, Operator A will therefore provide a stamp image including both human readable instructions, and machine readable instructions, by use of an inking/stamping device such as described above in connection with FIGS. 2 and 4-9.

Once Operator B has performed his or her tasks, Operator B (or another operator) provides the redacted document to a scanning computer system 78a, which reads the machine-readable instructions and automatically scans Doc A into an electronic data storage file (e.g., within computer processing system 78a). Thereafter, additional actions may be taken on the hardcopy version of Doc A (74a), or processing may end 80.

Returning again to document input section 72, a second document Doc B (74b) is provided to a computer system 78b. This computer system 78b may be designed to receive instructions from a variety of sources, as known in the art, including from a keyboard input, from another computer, via an external data line, wirelessly or by any other known manner. The computer system 78b can also include a printing section 82. In this example, the instructions received by computer system 78b include instructions to print on Doc B (74b) a combination of human readable information/instructions and machine readable information/instructions. Then when computer system 78b has finished processing Doc B (74b), a human operator, Operator C (76c), reads the human readable portion of those instructions/data and undertakes the instructions. Thereafter, Operator C (76c) adds additional human readable and machine readable data to the partially processed hardcopy Doc B (74b). These additional operations may then be performed by computer system 78c, and human Operator D (76d). Such processing continuing until the end of processing 84.

The above examples illustrate the intermixing of human operations and automated operations are possible by the use of the concepts of the present application. As shown above, the human readable and computer readable data may be manually added by the various inking/stamping devices not only at the very beginning of the process, but may be added at any location within the process.

In the foregoing discussion, the machine readable data are read by systems called computing systems. It is to be appreciated these may also be discussed herein as processing systems, or by other names, but are intended to reflect the concept of a process occurring by a machine rather than by a human operator.

As may be observed from the foregoing embodiments, in one design the inking/stamping devices disclosed above are implemented as hand-held manual stamps. This is of a particular benefit in some embodiments, as it permits integration of such inking/stamping devices into the manual operations of a processing system. Particularly, in a large hardcopy document processing system, or in even smaller office environments, document processing operations are in use where manual stamps are already employed in the systems. Therefore, by the creation of a manual stamp which relays both human readable and machine readable data, such inking/stamping devices may be incorporated into existing systems without the requirement of re-engineering the overall process.

The above-described inking/stamping devices as disclosed in FIGS. 2, 4-9 can be made using various methods and tools. In certain embodiments, a designer first decides on what message they want to encode, or decides on the index of a inking/stamping device (hence one byte may be sufficient, when a glyph type code is used). Preferably the designer decides (for glyph codes) error correction strength (robustness), resolution, as well as size, and layout of the inking/stamping device.

The designer may then (for a glyph code device) use a glyph encoder to create a glyph bitmap. For example, the designer can use a DataGlyph web interface or a command line tool (e.g., dgencode from the PARC DataGlyph toolkit). Next, the user designs the layout of the stamp, such as with an image editor, to put the glyph bitmap and the human readable text together. Examples of image editors include Photoshop, gimp on Linux, or ScanScribe from PARC, and the like.

Subsequently, the designer can manufacture the stamp according to any known methods, or commercially obtain a desired stamp by ordering from a stamp-making company. In ordering the stamp, the user would submit the design (a bitmap) to a stamp maker. The designer can also integrate the glyph decoder such as dgdecode, or the relevant functions provided by a toolkit library, into his or her document processing system. The user is now able to apply the stamp on a form, scan the form, and use a glyph decoder to detect and decode the stamp.

In the above discussion, the documents to be processed are generally hardcopy documents of any shape and size. The documents may be recorded on various mediums with flat or curved surfaces, such as paper, plastic, glass, and metal. The documents may take various forms such as sheets, forms, slip sheets, cover sheets, business cards, labels, identification cards, and name tags etc. The content on the documents include, in addition to the machine-readable data and the human-readable data, other optional information embodied as text, image, or both.

In exemplary embodiments, the machine-readable data may be applied to the document using two-dimensional data codes for storing digital data on hardcopy documents.

Examples of two-dimensional data codes include, but are not limited to, the PDF417 code developed by Symbol Technologies, Inc.; Data Matrix developed by International Data Matrix; Vericode developed by Veritec, Inc.; CP Code developed by Teiryo, Inc. and Integrated Motions, Inc.; Maxicode developed by the United Parcel Service; Softstrip developed by Softstrip, Inc.; Code One developed by Laserlight Systems; Supercode developed by Metanetics Inc.; DataGlyph, developed by Xerox Corporation; and the like.

In certain embodiments, two-dimensional data codes are used in applying the machine-readable data on the document, at least partially because two-dimensional data codes have an advantage over one-dimensional data codes in enabling greater data density. For example, a typical bar code can contain from about 9 to about 20 characters per inch, while a typical two-dimensional data code can contain from about 100 to about 800 characters per square inch.

In certain embodiments, self-clocking glyph codes such as Xerox DataGlyphs are used in applying the machine-readable data on the document. DataGlyphs are a manner of encoding data with a series of marks that in one design may slant either from top-left to bottom-right or from bottom-left to top-right. These glyphs not only encode the information that is embedded in the code, but also define the sample clock that is employed to extract that information from the code, so they are responsible for the "self-clocking" property of the code as well as the distortion and noise tolerance. DataGlyphs are written on a two-dimensional spatially periodic pattern of centers, such as a regular lattice-like pattern of centers, and the spatial periodicity of the glyphs causes the code to have a more-or-less uniformly textured appearance. In an embodiment, logically ordered single bit digital quanta are encoded in DataGlyphs by respective elongated slash-like glyphs which are written on a two-dimensional, spatially periodic pattern of centers in accordance with a predetermined spatial formatting rule, with the individual glyphs being tilted to the left or right of vertical by approximately +45° and −45° for encoding logical "0's" and "1's", respectively. The mutual orthogonality of the glyph encodings for the two logical states of these single bit digital quanta enhances the discriminability of the code sufficiently to enable the embedded information to be recovered, even when the code pattern is written on a sufficiently fine grain pattern of center to cause the code pattern to have a generally uniform grayscale appearance. In another embodiment, self-clocking glyph codes such as DataGlyphs can be designed to encode multi-bit digital quanta in the glyphs.

A known advantage of self-clocking glyph codes such as DataGlyphs is that they ordinarily have an unobtrusive visual appearance. Another advantage associated with DataGlyphs is that, unlike most barcodes, they are flexible in shape and size. Their structure and robust error correction also make them suitable for curved surfaces and other situations where barcodes fail.

Being machine detectable, the DataGlyphs may be visible or invisible to human eyes. When invisibility of the DataGlyphs is desired, one can use suitable materials that are human invisible but machine detectable based on the material's infrared reflectivity, the material's high resolution spectral detail, the material's metameric spectral characteristics, and/or the material's magnetization, among others. Of course, one can also use human visible materials such as xerographic toner and ink, with their usual visible characteristics of color, whiteness, blackness, and transparency.

In exemplary embodiments, the document processing system includes computing systems, which may include one or more input devices that are designed to read the machine-readable data, such as copiers, digital copiers, regular scanners, video cameras, fax scanners, laser scanners, flatbed scanners, optical character recognition scanners (OCR), hand-held scanners, bar scanners, network and telephone communication ports, other digitizing apparatus, and the like. In preferred embodiments, the input device comprises a scanner consisting of an imaging detector coupled to a microprocessor for decoding. The scanner is preferably an automated scanner capable of handling multiple jobs and multi-page documents without user intervention. The scanner can also be packaged into pen-like pointing devices or guns.

Optionally, the document processing system includes in the computing systems one or more output devices such as printers, screen displays, fax terminals, facsimile machines, modems capable of sending fax messages, network and telephone communication ports and the like. The input device and the output device of the processing system may be included in the same device or in different devices.

The computing systems of the processing system may also include one or more repositories. The repository may be any type of memory or storage such as RAM, ROM, CD-ROM, or other media of storage such as hard disk, floppy disk, magnetic tape, or the like. For example, the repository may be the local memory in a printer, or the repository may be a networked memory located on an intranet or the Internet. Multiple memories or repositories may be used as well.

In various embodiments, the machine-readable data contain a data structure. The data structure may carry the document-processing instruction to be executed. For example, the data structure may include a service code. The desired service may be known from accessing a list of possible services stored locally on an action processor of the computer/processing system, or may also be determined by accessing a service database, or alternatively may be inferred simply from the identity of the user.

In one embodiment, the service code is a single byte (eight binary bits). Accordingly, the service code can represent up to 256 different possible actions, transformations, and services to be executed on the document. Exemplary services include, but not limited to:

"Scan to document repository";
"Scan to document repository and index";
"Scan and send to designated destination via network";
"Scan and send via e-mail";
"Scan and send to my personal e-mail account";
"Scan and fax";
"Scan and print copies";
"Scan and search";
"Scan and recognize characters via optical character recognition software";
"Scan, recognize characters, and search the text";
"Scan, recognize characters, and e-mail the text";
"Scan and reformat to X";
"Scan and convert into a standard electronic format Y";
"Scan and convert into Microsoft Word format"; and
"Scan and extract".

In an embodiment, a service may involve transformation of the document from hardcopy to electronic form, and possibly back to hardcopy form.

In another embodiment, one or more possible actions involve the removal or alteration of the machine-readable data such as DataGlyph pattern on the digitized image of the document, as its presence is no longer necessary, once it has been acted upon by the processing system.

Optionally, the data structure also includes a coded argument to the service code. In an embodiment, the argument is an additional byte (eight bits) of information. For example, certain services may require a numeric argument, for example, "scan and print copies" followed by an argument of "10" will print ten copies. Other services may require a differently coded argument, for example, "scan and fax" followed by an argument of "2" may represent a command to fax the document to the user's home fax number, as opposed to an office fax number or, perhaps, an alternate office fax number, both of which would have different argument numbers.

Optionally, the data structure also includes an identity code. In an embodiment, the identity code includes sixteen bytes of identity information, which is sufficient to encode a unique identification number for each member of nearly any conceivable population, and eight bytes of security information, the latter rendering the identity code essentially tamper-proof. The identity information may be formed from a network address (either an Ethernet address or an IP address), a time stamp, and a sequence number.

In an embodiment, the information on the user's identity can be obtained, for example, by scanning and analyzing one of the user's business cards. This information is stored in a database and is given a unique user ID number.

Optionally, the data structure also includes error-correction and synchronization information in a manner well known in the art.

The human-readable data are coordinated with the information. By coordination, it means, for example, that the human-readable data may be rendering, summary, outline, excerpt, animation, icon, and visualized sign based on the information that is embedded in the machine-readable data such as DataGlyphs.

Various exemplary embodiments provide an inking/stamping device generating machine-readable data and human-readable data which can be applied on a document, wherein the machine-readable data comprise a document-processing instruction to be executed on the document; and the human-readable data are coordinated with the machine-readable data. In an embodiment, a processing system reads the machine-readable data generated from the stamp, and optionally executes at least part of the document-processing instruction automatically.

Due to the encoding mechanism of DataGlyphs, it is not likely to mistake other things as DataGlyphs; in other words, false positives are not likely to happen. DataGlyphs are easy to decode, and good at noise resistance; for example, a stamped DataGlyph is decodable even when it overlaps with lines and text of the form underneath.

DataGlyphs have high data capacity; for example, using one byte raw data can generate 256 different stamps. At 600 dpi, DataGlyphs can offer up to 1 KB per square inch of data. At this density, a Gettysburg Address fits in a block with the size of a small US postage stamp. For a stamp as shown in FIG. 2, it took about 1 second to detect and decode a 300 dpi black and white scan on a 2.8 Ghz Pentium-4.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document processing system for processing hardcopy documents, the system comprising:
   (i) a single manual inking/stamping device for simultaneously applying coordinated machine-readable data and human readable data to a hardcopy document to be processed in the document processing system; and
   (ii) a processing system, including human operators for employing manual operations and one or more computer processing systems for employing automated operations,
   wherein the machine-readable data comprise document-processing instruction(s) to be executed on the document provided as self-clocking glyph code; and the computer processing system is adapted to read the machine-readable data and to execute at least part of the document-processing instruction(s) automatically, and wherein the machine-readable data and the human readable data are arranged on the hardcopy document in proximity to each other so as to be recognizable as coming from the single device.

2. The document processing system of claim 1, wherein the single device is an inking/stamping device, used to simultaneously apply the machine-readable data and the human-readable data to the document.

3. The document processing system of claim 2, wherein the inking/stamping device further includes machine readable data that provides local addressability which permits identification of unique coordinates in a high-dimensional space.

4. The document processing system of claim 3, wherein the machine readable data is a glyph address carpet encoding.

5. The document processing system of claim 2, wherein the inking/stamping device is a dynamic device.

6. The document processing system of claim 2, wherein the inking/stamping device is a static device.

7. The document processing system of claim 2, wherein the machine readable data and human readable data are separated by less than one inch.

8. The document processing system according to claim 1, in which the document machine-readable data is a type of a two-dimensional data code.

9. The document processing system according to claim 1, in which the processing system includes at least one input device that is designed to read the machine-readable data.

10. The document processing system according to claim 1, in which the machine-readable data contain a data structure such as a service code carrying the document-processing instruction to be executed on the document.

11. The document processing system according to claim 1, in which the human-readable data is at least partially formed by the machine-readable data.

12. An inking/stamping device comprising:
a single manual inking/stamping device for simultaneously forming coordinated machine-readable data and human-readable data, said device comprising:
a machine-readable data area, containing data in the form of a self-clocking glyph code, and
a human-readable data area containing data readable by a human operator without assistance of any device,
wherein the machine-readable data area comprises a document-processing instruction in self-clocking glyph code to be automatically executed by a computing system and the human-readable data area comprises a document-processing instruction to be manually executed by a human operator.

13. The device according to claim 12, wherein the machine-readable data is glyph data.

14. The device according to claim 12, in which the inking/stamping device is at least one of an ink stamp, a self-inking stamp, a cube stamp, a dial stamp, or combination thereof.

15. The device according to claim 12, wherein the inking/stamping device is a dynamic device.

16. The device according to claim 12, wherein the inking/stamping device is a static device.

17. A method for processing a document, which comprises:
(i) employing a single manual inking/stamping device to simultaneously apply to the document machine-readable data in a format of a two-dimensional self-clocking glyph code that contains document-processing instructions and to
apply to the document human-readable data that contains human-readable processing instructions, wherein the machine-readable and human-readable data are coordinated;
(ii) reading the machine-readable data by a computing system; and
(iii) executing at least part of the document-processing instruction automatically, wherein the machine-readable data and the human readable data are arranged on the hardcopy document in proximity to each other so as to be recognizable as coming from the single device.

18. The method according to claim 17, in which the format of the two-dimensional code of the machine-readable data are glyphs, and step (ii) includes converting the document into bitmap format by a scanning device; reading the bitmap by an action processor in the computing system; locating the glyphs from the bitmap; and decoding the glyphs to acquire the document-processing instruction.

* * * * *